United States Patent
Preden et al.

(10) Patent No.: US 8,966,046 B2
(45) Date of Patent: Feb. 24, 2015

(54) DEVICE AND METHOD FOR A MULTI-HOP MOBILE AD HOC NETWORK

(75) Inventors: Jürgo-Sören Preden, Tallinn (EE); Madis Uusjärv, Ihasaluküla (EE)

(73) Assignee: Defendec Inc., Tallinn (EE)

( * ) Notice: Subject to any disclaimer, the term of this patent is extended or adjusted under 35 U.S.C. 154(b) by 260 days.

(21) Appl. No.: 13/702,110

(22) PCT Filed: Jun. 9, 2011

(86) PCT No.: PCT/IB2011/052508
§ 371 (c)(1),
(2), (4) Date: Feb. 12, 2013

(87) PCT Pub. No.: WO2011/154911
PCT Pub. Date: Dec. 15, 2011

(65) Prior Publication Data
US 2013/0138792 A1    May 30, 2013

(30) Foreign Application Priority Data
Jun. 10, 2010 (FI) ...................................... 20105658

(51) Int. Cl.
*H04L 12/00*    (2006.01)
*H04J 1/00*    (2006.01)
(Continued)

(52) U.S. Cl.
CPC .......... *H04L 41/02* (2013.01); *H04W 52/0216* (2013.01); *H04W 56/001* (2013.01); *H04W 8/005* (2013.01); *H04W 84/18* (2013.01); *Y02B 60/50* (2013.01)

USPC .......... 709/223; 709/224; 709/225; 370/254; 370/321; 370/338

(58) Field of Classification Search
CPC .................................. H04L 12/00; H04J 1/00
See application file for complete search history.

(56) References Cited

U.S. PATENT DOCUMENTS 6,192,230 B1    2/2001    van Bokhorst et al.
7,161,926 B2 *  1/2007    Elson et al. ................... 370/338
(Continued)

FOREIGN PATENT DOCUMENTS

WO    2006067271 A1    6/2006
WO    WO 2006067271 A1 *    6/2006
WO    2009018251 A1    2/2009

OTHER PUBLICATIONS

"Cluster Synchronization in networks of coupled non-identical dynamical systems"—Lu et al, Fudan University, Dec. 2009 http://arxiv.org/pdf/0912.2418.pdf.*

(Continued)

*Primary Examiner* — Randy Scott
(74) *Attorney, Agent, or Firm* — Barnes & Thornburg LLP

(57) ABSTRACT

An ad hoc network having self-organized clusters of nodes, i.e., one-hop ad hoc subnetworks. Any node can assume the role of a routing node if it is able to communicate with at least one node in another cluster so as to self-organize the clusters of nodes into a multi-hop ad hoc network. An intra-cluster synchronization of sleep and awake periods of nodes in a power-saving mode of operation is performed separately within each cluster. An inter-cluster synchronization of awake periods of neighboring clusters to be temporally non-overlapping is performed by the routing nodes.

17 Claims, 5 Drawing Sheets

(51) Int. Cl.
*H04L 12/24* (2006.01)
*H04W 52/02* (2009.01)
*H04W 56/00* (2009.01)
*H04W 8/00* (2009.01)
*H04W 84/18* (2009.01)

(56) References Cited

U.S. PATENT DOCUMENTS

| | | | |
|---|---|---|---|
| 7,281,057 | B2 | 10/2007 | Cain |
| 2002/0105970 | A1 | 8/2002 | Shvodian |
| 2005/0034007 | A1* | 2/2005 | Nemawarkar et al. ........ 713/500 |
| 2006/0120303 | A1 | 6/2006 | Yarvis et al. |
| 2007/0036105 | A1 | 2/2007 | Chun et al. |
| 2009/0016321 | A1 | 1/2009 | Li et al. |
| 2010/0067404 | A1* | 3/2010 | Van Wageningen et al. . 370/254 |
| 2010/0118837 | A1 | 5/2010 | Bracha |
| 2010/0131644 | A1 | 5/2010 | Jeong et al. |

OTHER PUBLICATIONS

International Preliminary Report on Patentability for International Patent Application No. PCT/IB2011/052508; Sep. 3, 2012.

Search Report for Finnish Patent Application No. 20105658; Jun. 3, 2011.

Search Report for International Patent Application No. PCT/IB2011/052508; Oct. 18, 2011.

* cited by examiner

DEVICE AND METHOD FOR A MULTI-HOP MOBILE AD HOC NETWORK

PRIORITY CLAIM

This patent application is a U.S. National Phase of International Patent Application No. PCT/IB2011/052508, filed 9 Jun. 2011, which claims priority to Finnish Patent Application No. 20105658, filed 10 Jun. 2010, the disclosures of which are incorporated herein by reference in their entirety.

FIELD OF THE INVENTION

The invention relates to multi-hop ad hoc networks.

BACKGROUND OF THE INVENTION

A "mobile ad hoc network" (referred to as a MANET herein) is a collection of wireless nodes (mobile hosts) that can dynamically be set up anywhere and anytime without using any pre-existing network infrastructure. MANET is a type of packet switching network wherein each mobile device is an autonomous node, which may function as both a host and a router. In other words, besides the basic processing ability as a host, the mobile devices can also perform switching functions as a router forwarding packets from other nodes. MANET is an autonomous system in which each mobile device is free to move randomly and independently in any direction, and will therefore change its wireless links to other devices frequently. Since the nodes are mobile, the network topology may change rapidly and unpredictably and the connectivity among the terminals may vary with time. Thus, the mobile nodes in the network should adapt to the traffic and propagation conditions and dynamically establish routing among themselves as they move about, forming their own network on the fly. The wireless topology of a mobile ad hoc network may change rapidly and unpredictably. The structure of a mobile ad hoc network is not fixed, i.e. nodes can be added to or removed from the network while the network is operational without causing irreversible failures. Such a self-configuring network may operate in a standalone fashion, or may be connected to the larger Internet.

Since the topology of the network is constantly changing, the issue of routing packets between any pair of nodes becomes a challenging task. Basic types of ad hoc routing algorithms can be single-hop and multihop, based on different link layer attributes and routing protocols. Single-hop network is simpler than multihop network in terms of structure and implementation, with the cost of lesser functionality and applicability. In the multihop scenario, when delivering data packets from a source node to its destination node out of the direct wireless transmission range, the packets should be forwarded via one or more intermediate nodes. However, a single-hop network sends data directly from a source node to a destination node. In practice, nearby nodes can communicate directly by exploiting a single-hop wireless technology (e.g., Bluetooth, 802.11, etc.), while nodes that are not directly connected communicate by forwarding their traffic via a sequence of intermediate nodes. The forwarding is not necessarily "on-the-fly". Intermediate nodes may store the messages when no forwarding opportunity exists (e.g., no other nodes are in the transmission range, or neighbors are not suitable for that communication), and exploit any contact opportunity with other mobile devices to forward the data toward the destination. The failure of a set of links or nodes in the underlying network can cause the network to break apart into two or more components or clusters. As a result of this, nodes within a cluster can communicate each other, but communication between the nodes in different clusters is not possible. Very often the network will partition and remerge, affecting the performance of routing protocols.

Examples of such networks vary from radio-linked sensors distributed like seed by air drop, to the behavior of satellites in random orbits, to automotive applications in which cars and traffic lights are communicating nodes, to military applications such as battlefield communications among soldiers, vehicle-mounted devices, and consumer devices at home.

Among multi-hop ad hoc networks, wireless sensor networks have a special role. A sensor network is composed of a large number of small sensor nodes, which are typically densely (and possibly randomly) deployed inside the area in which a phenomenon is being monitored. Wireless multi-hop ad hoc networking techniques constitute the basis for sensor networks, too. However, the special constraints imposed by the unique characteristics of sensing devices, and by the application requirements, make the solutions designed for multi-hop wireless networks (generally) not suitable for sensor networks. Sensor networks produce a shift in the networking concept from a node-centric to a data-centric view. The aim of a sensor network is to collect information about events occurring in the sensor field rather than supporting the communications between users' devices.

Moreover, power management is an important issue in the design of all light-weight mobile devices with low CPU processing capability, small memory size, and low power storage. Such devices need optimized algorithms and mechanisms that implement the computing and communicating functions. Also sensor network nodes utilize on-board batteries with limited energy that cannot be replenished in most application scenarios. Thus, the communication-related functions should be optimized in the power consumption point of view. Conservation of power and power-aware routing must be taken into consideration.

Many wireless devices support power-saving modes in which the radio of a mobile node only needs to be awake periodically. The period of time, when a mobile node is in a sleep mode, is called a sleep period, and the period of time when a mobile node is in an active or awake mode is called an awake period herein. Typically, at least the radio communication parts, i.e. a radio transmitter and radio receiver, of a mobile node are turned off for the sleep period, but also other parts of the node, such as a processor, may assume a power-saving state. During the awake period, at least a radio receiver of a mobile node is turned on, and optionally a transmitter, if transmission is necessary. The lower power consumption is achieved, when a mobile node has its radio turned off most of the time, and the radio is turned on only during short awake periods for communication with other nodes. This enables a significant saving in the power consumption compared to leaving a device fully on all the time. In order to enable communication, nodes should wake up synchronously at the same time. The synchronous wakeup operation is easily achieved in a master-slave configuration, when mobile nodes are timed from a network infrastructure, such as from a fixed station. However, in a multi-hop ad hoc network there normally is no master node available for timing the sleep and awake periods of other "slave" nodes. The master node configuration is also very vulnerable in a multi-hop mobile ad hoc network: if a master node is removed or fails, all slaves would lose their synchronism. In a "no master" configuration, mobile nodes wake up more or less asynchronously, and data communication may fail, or at least there will be a long propagation delay, when a message propagates through a multi-hop network: a first radio wakes up, waits until a neighboring second node wakes up, and sends a message to the second node, then the second node waits until a neighboring third node wakes up, etc.

DISCLOSURE OF THE INVENTION

An object of the present invention is to improve operation of a node in a power-saving mode in an ad hoc network. The objects of the invention are achieved by means of a method, a node device and an ad hoc network according to the attached independent claims. The preferred embodiments of the invention are disclosed in the dependent claims.

An aspect of the invention is a method of operating a node in an ad hoc network, comprising joining or initiating an own cluster in an ad hoc network, wherein a plurality of nodes is able to self-organize themselves into clusters of nodes, each cluster comprising a collection of nodes which are capable of one-hop communication directly with each other, performing an intra-cluster synchronization of sleep and awake periods of nodes in a power-saving mode of operation within a cluster, selectively assuming a routing function to a neighboring cluster so as to self-organize the clusters of nodes into a multi-hop ad hoc network, and performing, when the routing function is assumed, an inter-cluster synchronization of awake periods of the own cluster and the neighboring cluster to be temporally non-overlapping.

According to an embodiment of the invention, the method comprises keeping awake during the awake periods of both the own cluster and the neighboring cluster to perform said inter-cluster synchronization and to provide an inter-cluster multi-hop communication.

According to an embodiment of the invention, the method comprises employing a contention mechanism for medium access within a cluster.

According to an embodiment of the invention, said intra-cluster synchronization comprises periodically broadcasting synchronization messages to and receiving synchronization messages from nodes belonging to the own cluster, at beginning of the awake period of the own cluster in order synchronize clocks of the nodes according to the synchronization messages broadcast within the cluster.

According to an embodiment of the invention, the method comprises, in response to receiving a cluster synchronization message from another node in the own cluster, synchronizing the own clock using a receive time of the received cluster synchronization message and a time offset from a awake period start time indicated in the received cluster synchronization message.

According to an embodiment of the invention, said inter-cluster synchronization comprises detecting, when the routing node function is assumed, an intra-cluster synchronization of the neighboring cluster.

According to an embodiment of the invention, said inter-cluster synchronization comprises synchronizing, when the routing node function is assumed, the own clock according to cluster synchronization messages broadcasted within the own cluster, determining, when the routing node function is assumed, a clock of the neighboring cluster based on cluster synchronization messages broadcast within the neighboring cluster, checking, when the routing node function is assumed, whether the clock of the own cluster and the clock of the neighboring cluster are synchronized, performing, if necessary, when the routing node function is assumed, the inter-cluster synchronization by advancing or postponing a transmission time of cluster synchronization messages within the own cluster in relation to the clock of the neighboring cluster.

According to an embodiment of the invention, the joining to a cluster comprises monitoring cluster synchronization messages broadcast in the ad hoc network for a predetermined period of time, selecting one of existing clusters according to some criteria based on the cluster synchronization messages received during the monitoring period, and initiating a cluster join procedure to join the selected cluster.

According to an embodiment of the invention, the method further comprises initiating a new cluster initialization procedure, if no cluster synchronization messages are received during the monitoring period, or if the cluster join procedure fails.

According to an embodiment of the invention, the cluster join procedure comprises sending a join request message to one of the nodes in the selected existing cluster, in response to receiving a join response message, which indicates that the join request is accepted and contains a list of nodes that are currently in the selected cluster, sending inquiry to all nodes in the selected cluster, joining the selected cluster if a reply is received from all nodes in the selected cluster.

According to an embodiment of the invention, the time domain is divided into time slots and the awake period of each cluster occupies one time slot in the time domain.

According to an embodiment of the invention, a new cluster initialization procedure comprises selecting for the new cluster a free time slot which is not occupied by neighboring clusters in the time domain, deriving an identifier of the new cluster from a identifier of the selected time slot, broadcasting a cluster initiation message declaring the new cluster, operating in the new cluster whose wakeup period occupies the selected time slot.

According to an embodiment of the invention, comprising staying awake and monitoring all the time slots in the time domain at predetermined intervals, to detect any neighboring clusters that the current cluster is not aware of.

According to an embodiment of the invention, wherein the selectively assuming a routing function comprises setting up a routing partnership with a node in a neighboring cluster which becomes the partnering router, broadcasting a notification of setting up of the routing partnership in the own cluster.

According to an embodiment of the invention, comprising in response to losing the routing partnership with the node in the neighboring cluster, broadcasting a notification of cancellation of the routing partnership in the own cluster.

Another aspect of the invention is an ad hoc network node implementing method steps according to any embodiment or combination of embodiments of the invention.

Another aspect of the invention is an ad hoc network comprising a plurality of nodes implementing method steps according to any embodiment combination of embodiments of the invention.

Embodiments of the invention allow a flexible and less vulnerable operation of nodes in a power save mode in a multi-hop ad hoc network, while having sufficient synchronization.

BRIEF DESCRIPTION OF THE DRAWINGS

In the following the invention will be described in greater detail by means of exemplary embodiments with reference to the attached drawings, in which.

EXEMPLARY EMBODIMENTS OF THE INVENTION

Figure 1A:
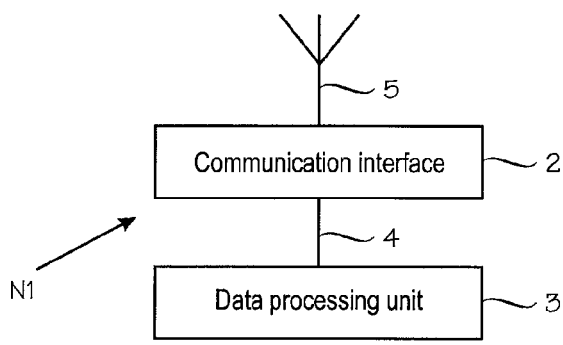
FIG. 1A illustrates a simplified schematic diagram of an exemplary node.

As used herein, the term "mobile ad hoc network" is a collection of wireless nodes (mobile hosts) that can dynamically be set up anywhere and anytime without using any pre-existing network infrastructure. The structure of a mobile ad hoc network is not fixed but can change dynamically, i.e. nodes can be added to or removed from the ad hoc network while the ad hoc network is operational without causing irreversible failures. A node is an autonomous computing entity in a network. A simplified schematic diagram of an exemplary node N1 is illustrated in FIG. 1A. A node N1 may be provided with a communication interface 2 (such as wireless communication means, e.g. radio part with a transmitter, a receiver, and antenna 5) and a data processing unit 3 (which may include a processor and some memory as well as peripheral entities). A data and control interface 4 may be provided between the communication interface 2 and the data processing unit 3. The employed radio interface may be, for example, based a radio technology used in wireless local area networks (WLANs) or wireless personal area networks, such as IEEE 802.11, IEEE 802.15.1 (Bluetooth) or IEEE 802.15.4 technology.

Figure 1B:
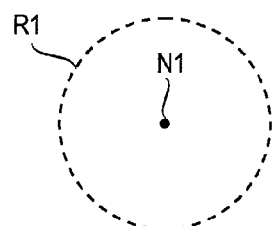
FIG. 1B illustrates a node and its communication radius.
Figure 1C:
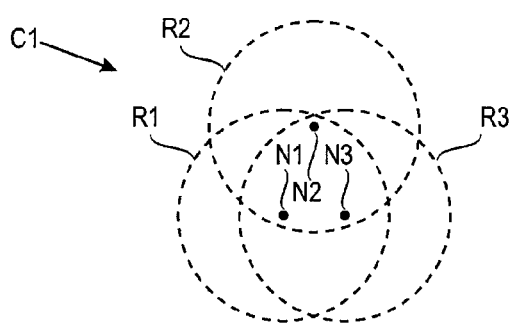
FIG. 1C illustrates a cluster of nodes.

As illustrated schematically in FIG. 1B, each node N1 (black dot) can be characterized by its communication radius R1 (dashed line circle) which is the effective range that the node N1 is able to communicate within. A cluster is a collection of nodes which are grouped together (self-organized to form a group) and able to communicate with each other directly over one hop (one communication link). Thus, one cluster is a kind of one-hop ad hoc subnetwork. Every node within an ad hoc network is a member of at least one cluster. A cluster C1 consisting of nodes N1, N2 and N3 with their respective communication radius R1, R2 and R3 is illustrated in FIG. 1C.

Figure 1D:
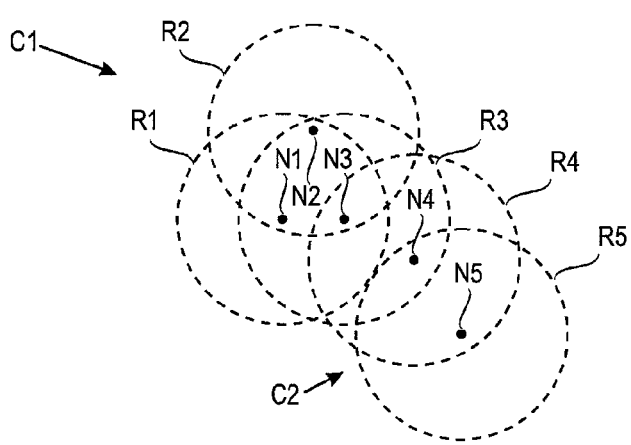
FIG. 1D illustrates neighboring clusters of nodes.

According to embodiments of the invention, an ad hoc network comprises a plurality of self-organized clusters of nodes, i.e. one-hop ad hoc subnetworks. As an example, an ad hoc network consisting of two clusters C1 and C2 is illustrated in FIG. 1D. If there is shown a line between two nodes, the nodes are in one-hop neighborhood of each other (they are able to communicate directly), e.g. nodes 1 and 3 are in the one hop neighborhood. Accordingly, nodes N1, N2 and N3 can form one cluster C1 while nodes N4 and N5 (with respective communication radius R4 and R5) may form another cluster C2. Further, nodes N1 and N4 can communicate only via node N3, i.e. over a multi-hop connection. A routing node in the cluster-based approach is a node which belongs to a cluster and is able to communicate with at least one node in another cluster. A routing node forwards packets from one cluster to another. Any node can assume the role of a routing node. In the example illustrated in FIG. 1D, node N3 in the cluster C1 is within the communication radius of node N4 in the cluster C1, and vice versa. Thus, node N3 is able to communicate with node N4 in the cluster C2, and node N3 may assume a function of the routing node for routing packets from the cluster C1 to the cluster C2, and vice versa.

In exemplary embodiments of the invention, it is assumed that the communication interface 2 of the node (e.g. radio parts) can be turned on and off periodically. The period of time when the communication interface 2 of a node is turned off is called the "sleep" period. A node or a cluster is asleep, when the communication interface 2 of the node or all nodes in a cluster are turned off and the node or nodes are not able to communicate. The period of time when the radio of a node is turned on is called the "awake" period. A node or a cluster is awake when the communication interface 2 of the node or all nodes in a cluster is (are) turned on and the node or nodes are able to communicate.

According to exemplary embodiments of the invention, the communication interfaces 2 of nodes (e.g. N1, N3, N3) that belong to one cluster (e.g. C1) are turned on and off in a substantially synchronous manner. This is called intra-cluster synchronization herein. In exemplary embodiments, an intra-cluster clock synchronization may performed such that nodes belonging to a cluster broadcast a cluster synchronization message periodically, e.g. in a round robin fashion, at the beginning of the awake period of the cluster. The nodes receiving the cluster synchronization message may synchronize their clocks using the receive time of the message and the time offset from the start of the awake period embedded in the message. Nodes belonging to a cluster may use a contention mechanism for medium access. Examples of suitable contention mechanisms include carrier sense multiple access with collision avoidance (csma/ca) or carrier sence multiple access with collision detection (csma/cd). In radio networks (e.g. IEEE 802.11 or IEEE 802.15), the nodes in the network may have to tune their radios to the same frequency and they access the medium using the csma discipline. In other words, if the receiver can tell that someone else is transmitting, it may attempt to not interrupt, but there is no guarantee that it will be able to sense collisions. There are also other suitable access themes, such as Code Division Multiple Access (Spread Spectrum CDMA), Time Division Multiple Access (TDMA), Slotted ALOHA.

The awake periods of neighboring clusters (e.g. C1 and C2) are temporally disjoint, i.e. the awake periods of neighboring clusters are temporally non-overlapping. This may effectively mean that between neighboring clusters the TDMA (time division multiple access) medium access scheme is used regarding the awake periods. The time domain (temporal dimension) may be subdivided into time slots, and the awake period of each cluster may occupy one time slot in the time domain. The time slots of the neighboring clusters are non-overlapping, guaranteeing TDMA. According to an embodiment of the invention, when a new cluster is initiated and there is another cluster in the communication radius of the new cluster that is being created, the time slot for the new cluster is selected based on the time slot occupied by the existing cluster.

According to exemplary embodiments of the invention, the wakeup periods of neighboring clusters (e.g. C1 and C2) are loosely synchronized so that they are temporally non-overlapping, e.g. occupy different time slots. Such a loose synchronization is called an inter-cluster synchronization herein. The routing nodes (e.g. N3 and N4) on cluster borders may be responsible of the inter-cluster clock synchronization. A routing node (e.g. N3) is awake when both the cluster (e.g. C1) that it belongs to (the own cluster) is awake and when the cluster (e.g. C2) to which it acts as a router is awake. According to an exemplary embodiment of the invention a routing node may detect an intra-cluster synchronization of the neighboring cluster and adjust the intra-cluster synchronization of its own cluster dependent on the detected intra-cluster synchronization of the neighboring cluster. In an embodiment of the invention, the routing node synchronizes its clock according to the synchronization messages broadcasted within its own cluster, as explained above. As the routing node is awake also during the awake period of the neighboring cluster to which it provides routing services, it also receives the synchronization messages transmitted in the neighboring cluster and is able to detect the intra-cluster clock synchronization of the neighboring cell. As a consequence, the routing node is able to check if the clocks of the two clusters are appropriately synchronized. If required, the routing node may perform inter-cluster synchronization by, for instance, transmitting (broadcasting) the cluster synchronization message in its own cluster earlier if the clock of the neighboring cluster is ahead.

In the following, exemplary embodiments for implementing network synchronization will be disclosed without restricting the invention to these implementation examples.

Figure 2:
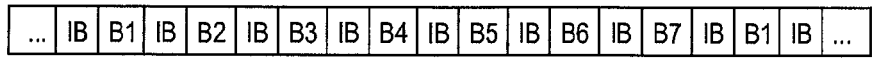
FIG. 2 illustrates an example of dividing the time domain into a number of cluster time slots for cluster synchronization.
Figure 3:
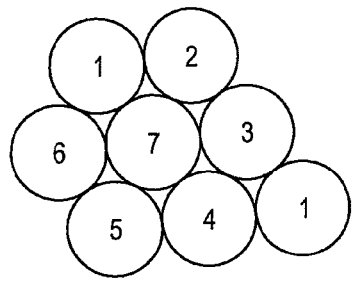
FIG. 3 illustrates an example of assigning cluster time-slots for different clusters.

For the network synchronization the time domain may be divided into a number of cluster time slots. An example of the time division is illustrated in FIG. 2. There are 7 cluster time slots B1-B7 (or beat time slots), forming a clock cycle (or beat cycle), and inter-cluster time intervals IB between the cluster time slots. All nodes belonging to a cluster time slot are in the one hop neighborhood of each other, such as nodes N1, N2 and N3 in FIG. 1D. The maximum number of nodes in a cluster may be limited, for example 10. The same cluster time slots B1-B2 may be reused by remote clusters which are at a sufficient distance away. The clusters may be provided with identifiers corresponding to the identifier of the cluster time slots, e.g. 1, 2, . . . , 10. Thus, a new cluster may assume the identifier of the respective cluster time slot. The clusters are arranged in a way that no node is in the one-hop neighborhood of two clusters with the same identifier. An example of assigning cluster time-slots for different clusters is illustrated in FIG. 3. For example circle 2 represents a cluster whose current identifier is C2, since it has an assigned cluster time slot B2. The time slot B1 and the respective identifier 1 are reused in two clusters which are sufficiently far away from each other.

Within the time slot B1 the nodes N1, N2 and N3 in cluster C1 may be awake, within the time slot B2 the nodes N4 and N5 in the cluster C2 may be awake, and so on. Between consecutive cluster time slots there may be an inter-cluster time interval, IB during which no nodes should be awake. The designator for the duration of the cluster time slot or the awake time (when nodes in a given cluster are awake) may be TB, for sleep time TS and for inter-cluster time TIB. Examples of suitable time constants are TB=100 ms, TS=670 ms, and TIB=10 ms.

Figure 4A:
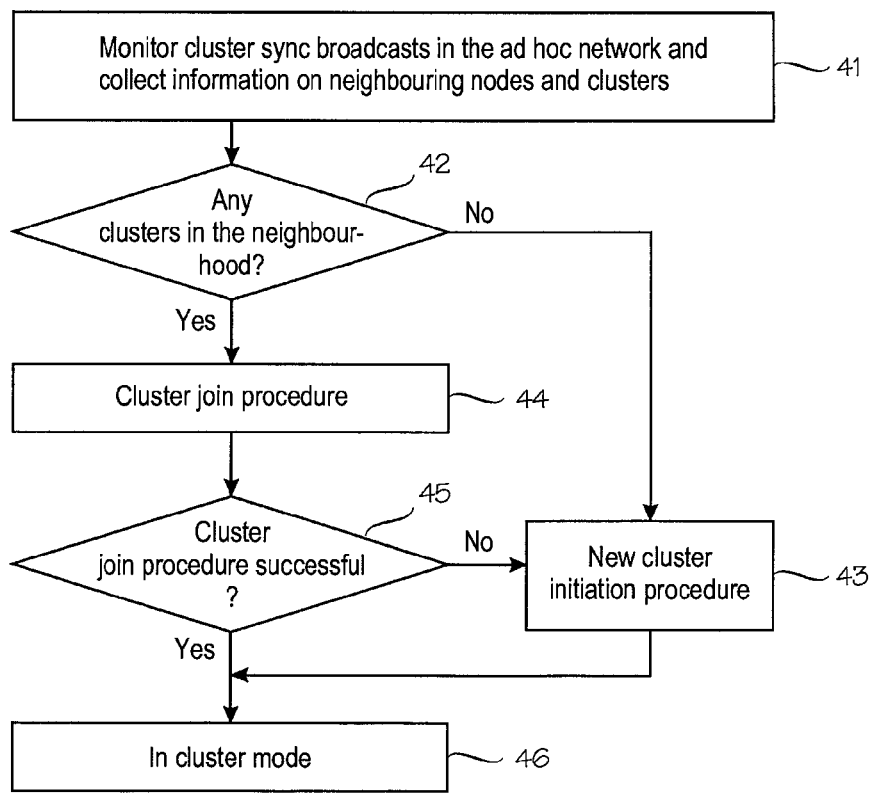
FIG. 4A is a flow diagram illustrating an example operation of a node entering an ad hoc network.
Figure 4B:
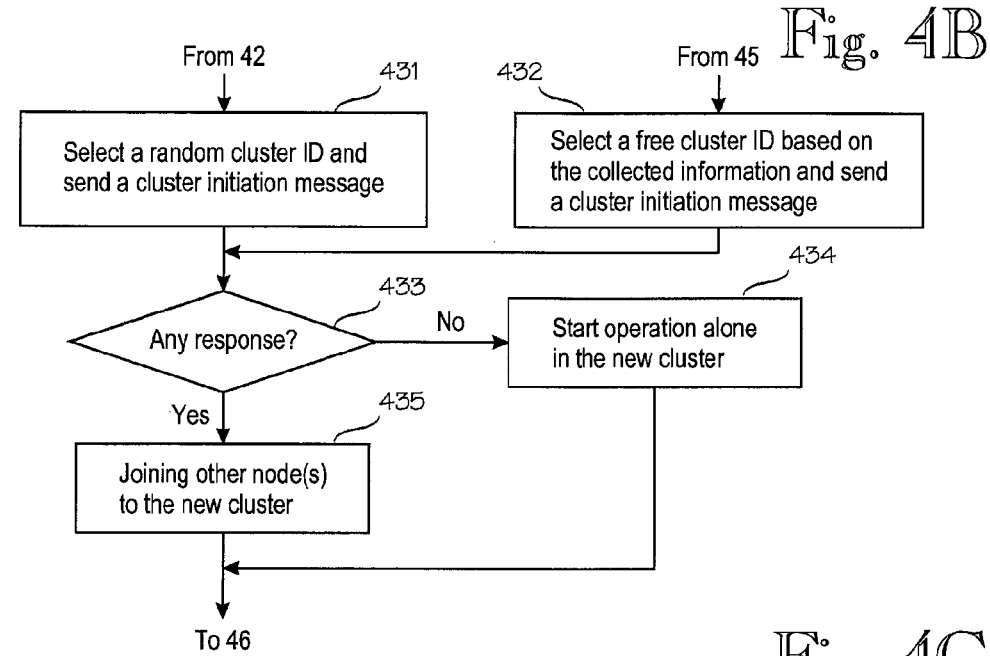
FIG. 4B is a flow diagram illustrating an example of a new cluster init procedure.

According to an exemplary embodiment of the invention, when a node N3 wants to join an ad hoc network, it may first monitor the time slots B1-B10 (step 41 in FIG. 4). If there are no other clusters in the neighborhood in step 42, the node N3 does not receive a cluster synchronizations message from any other node within a predetermined period of time, such as within three cluster synchronization cycles, the node initiates a new cluster initiation procedure (step 43), and finally enters an 'In cluster' mode with the new cluster (step 46).

If there at least one other cluster in the neighborhood in step 42, i.e. the node N3 receives a cluster synchronization message from at least one other node within the predetermined monitoring period, such as within three cluster synchronization cycles, the node may initiate a cluster join procedure (step 44).

If the cluster join procedure is successful in step 45, the node N3 enters an 'In cluster' mode with the joined cluster (step 46).

If the cluster join procedure fails in step 45, the node N3 may initiate the new cluster initiation procedure (step 43), and finally enters an 'In cluster' mode with the new cluster (step 46).

Thus, the new cluster init procedure (step 43) may be divided into two distinct cases according to the course of the procedure: 1) when there are no other clusters in the neighborhood (the procedure results from the test step 42) and 2) when joining to existing clusters failed (the procedure results from the test step 45). As illustrated in step 431 FIG. 4B, in the first case 1) the node N3 may send out a cluster initiation message, selecting a random cluster ID from the set of cluster IDs, e.g. 1-7. If there is no response to the cluster initiation message (step 433), the node may start operation according to the cluster it declared (being the only node in the cluster) (step 434). If there is a response, the other node that responded may join the new cluster (step 435). In the second case 2) the cluster ID is selected based on the IDs of the known clusters in the one-hop neighborhood of the node in question and the information on clusters in the two-hop neighborhood (step 432). The information on the one-hop and two-hop cluster IDs is acquired during the failed join attempts. Again, if there is no response to the cluster initiation message (step 433), the node may start operation according to the cluster it declared (being the only node in the cluster) (step 434). If there is a response, the other node that responded may join the new cluster (step 435).

Figure 4C:
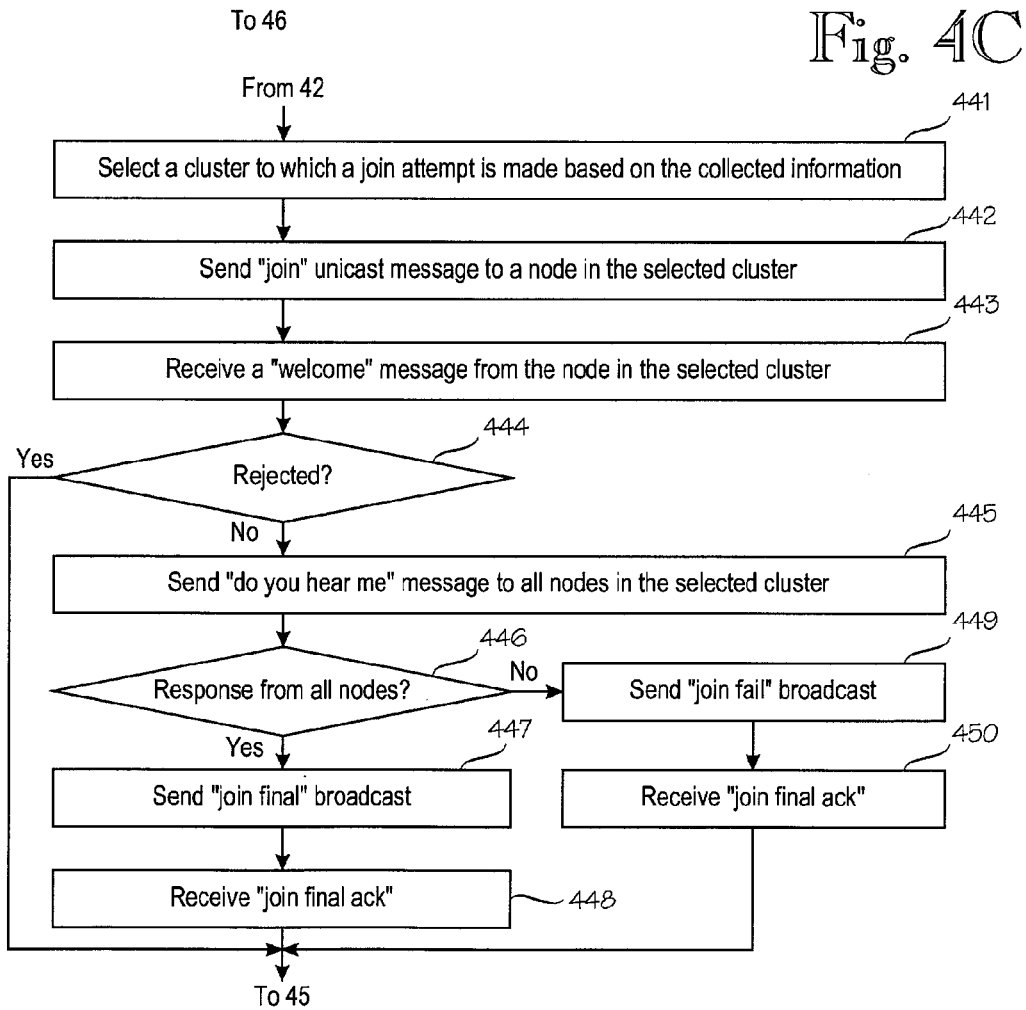
FIG. 4C is a flow diagram illustrating an example of a cluster join procedure.
Figure 5A:
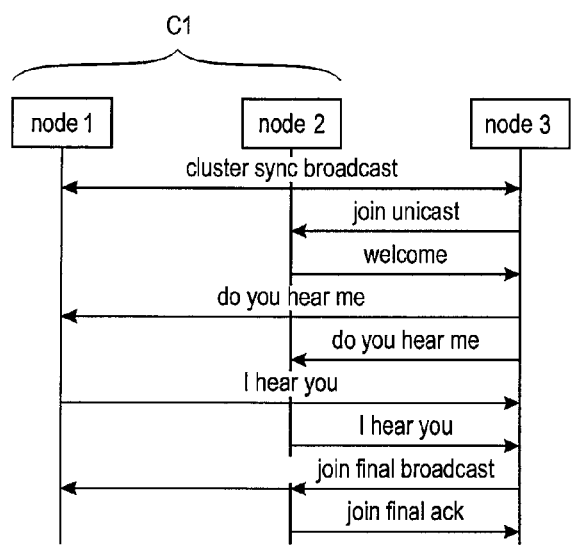
FIG. 5A shows a signaling diagram illustrating an example of a cluster join procedure.

An example of a cluster join procedure is illustrated in FIG. 4C. An example signaling relating to a successful cluster join procedure is illustrated in FIG. 5A. In the cluster join procedure a joining node N3 receives cluster synchronization messages and tries to join the network. After the joining node has collected information on the neighboring clusters it selects one of the clusters according to some criteria, such as the cluster with the least number of nodes (step 441 in FIG. 4C), and initiates the cluster join procedure by sending out 'join' unicast message to an originator of the received cluster synchronization message, i.e. to a node N2 in the existing cluster C1 (step 442). The 'join' unicast may contain the id of the cluster C1 that the node N3 wants to join, the id of the joining node N3 and the properties of the joining node N3, for example. The node N2 of the existing cluster C1 replies with a 'welcome' message that may contain a list (e.g. IDs) of nodes (e.g. node N1) that are currently present in the cluster C1 (step 443). The joining node N3 may also be rejected. For example, the node in the existing cluster may send a 'join reject' message in response to the 'join' message, e.g. when the number of nodes in the cluster already is equal to the maximum allowed number of nodes. Alternatively, the rejection may also be indicated in the 'welcome' message. In the example shown in FIG. 4C, upon receiving a 'welcome' message, the node N3 tests if the join is rejected (step 444). If rejected, the cluster join procedure may end as failed, or alternatively, the node N3 may select another cluster for a join attempt (i.e. return to step 441). If not rejected, the joining node N3 sends 'do you hear me' unicast messages to all the nodes (N1 and N2) in the cluster C1 based on the list included in the 'welcome' message (step 445). If the joining node receives 'I hear you' messages from all the nodes in the cluster (step 446), the cluster join procedure is successful. The joining node N3 completes a successful cluster join procedure with a 'join final broadcast' message that confirms the intent of the node to join the cluster (step 447). All the nodes belonging to the cluster and receiving the 'join final broadcast' message also add the originator of the message to their cluster node list. Finally, the node N2 that received the original 'join' unicast responds with a 'join final ack' message (step 448). In the illustrated example there are only two nodes N1 and N2 in the existing cluster C1 but there may be any number of nodes.

When a node that tries to join a cluster is already considered to be a member of the given cluster, the response to the 'join' unicast message may be a 'welcome' message with a 'already a member' flag set.

Figure 5B:
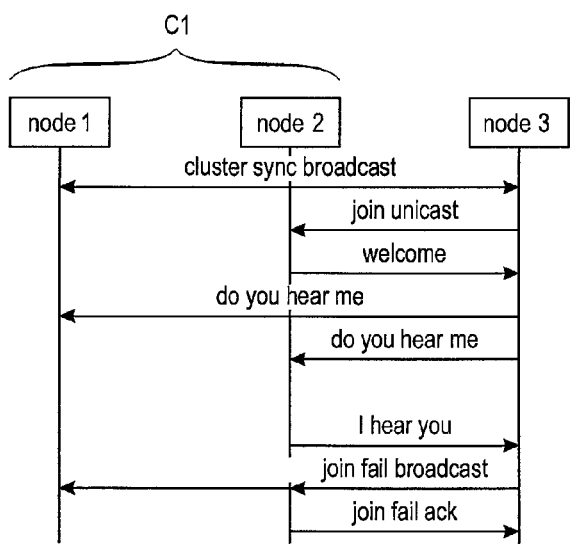
FIG. 5B shows a signaling diagram illustrating an example of a failed cluster join procedure.

FIG. 5B illustrates an example signalling of a failed join cluster procedure. The signalling in the beginning of the cluster join procedure is similar to that of FIG. 5A up to sending the 'Do you hear me' unicast messages to all the nodes in the cluster, corresponding to steps 441-445 in FIG. 4C. However, now the joining node N3 receives 'I hear you' message from the node N2 but not from the node N1 in the cluster C1 (step 446 results in 'No'), and the cluster join procedure is fails. The joining node N3 completes a failed cluster join procedure with a 'join fail broadcast' message (step 449) to which the node N2 that received the original 'join' unicast responds with a 'join fail ack' message (step 450). The 'join fail ack' message may include a list of IDs of neighboring clusters. Thus, although the node N3 is unable to join the cluster C1, the node N3 obtains the information on other nodes at one-hop and two-hop distance in the neighboring clusters. This information can be stored in the node and utilized for a new cluster initialization (if required), as described above, or for an inter-cluster routing initiation.

Figure 6:
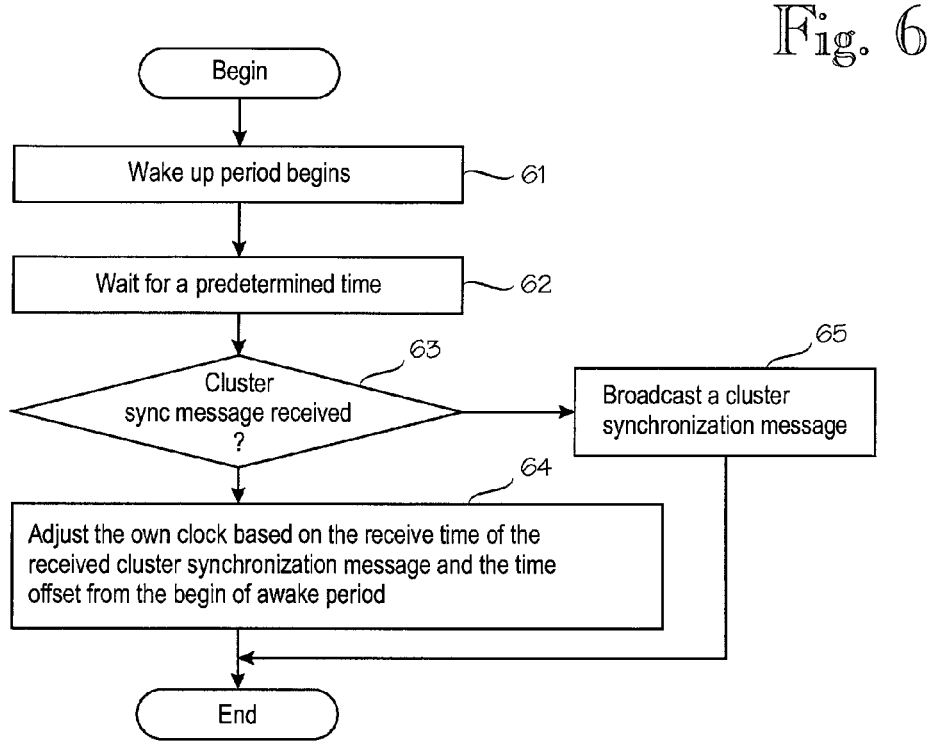
FIG. 6 is a flow diagram illustrating an example of an intra-cluster synchronization.

Upon receiving a 'join' message, no application level messages may be exchanged until the cluster join procedure has been completed either successfully or unsuccessfully. After the cluster join procedure, all nodes that have joined a cluster may enter the 'in cluster' mode in which they keep track of the cluster synchronization messages and also send out cluster synchronization messages themselves according to predetermined rules. As already explained above, according to an embodiment of the invention, the clocks of the nodes belonging to a cluster are synchronized (intra-cluster clock synchronization) in a way that nodes belonging to a cluster broadcast a cluster synchronization message periodically, e.g. in a round robin fashion, at the beginning of the awake period of the cluster. According to an embodiment illustrated in FIG. 6, a node broadcasts a cluster synchronization message (step 65), if the node has not received a cluster synchronization broadcast message from any other node in the cluster (step 63) within a certain timeframe (step 62) after waking up (step 61). The nodes receiving the cluster synchronization message (step 63) may synchronize their clocks using the receive time of the message and the time offset from the awake period start (step 64).

When a node has not received the cluster synchronization broadcast from another node of the cluster for a predetermined time in the 'in cluster' mode, e.g. for a multiple of synchronization cycles, the node may send a 'do you hear me' message to the node that has not broadcast the synchronization message. If there is no answer to that 'do you hear me' message, the node may broadcast a 'node dead' message declaring that the other node is no more in the cluster. When only one node is left in a cluster, then the last node initiates the cluster join procedure described above.

According to an embodiment of the invention, all nodes in a cluster keep information (data is stored locally) on all the one-hop neighboring clusters of the current cluster (this includes the node's own one hop cluster(s)) and also on the nodes, i.e. routing nodes, that maintain the connection to the neighboring one-hop cluster. When in the 'in-network' mode, the node may be awake for a full synchronization cycle at predetermined intervals, e.g. at every Nth synchronization cycle, to detect any neighboring clusters that the current cluster is not aware of. The value of N may depend on the dynamics of the application. Information on any new cluster detected in the neighborhood is stored locally in the node, and also broadcasted to the other members of the cluster to which the detecting node belongs, and stored there. According to an embodiment of the invention, when a node is awake for a full synchronization cycle but does not receive a synchronization message from a neighboring cluster that is assumed to be there, the node may send a 'do you hear me' message to a node of such a neighboring cluster. If there is no reply to the 'do you hear me' message the respective cluster information is erased from the node's memory and the information is broadcasted to other nodes in the own cluster of the node. This behavior may occur only after no beat message has been received for a predetermined number of awake full synchronization cycles.

According to an embodiment of the invention, in order to act as a router, a node sets up a routing partnership with a node in another cluster which becomes the partnering router. After a successful routing partnership has been set up, the routing node broadcasts an 'I am router' message in its own cluster and the partnering router broadcasts a matching 'I am router' message in its own cluster. The 'I am router' message may contain the ID of the neighboring cluster that the node is routing to, as well as the ID of the pair routing node in the other cluster. According to an embodiment of the invention, the 'I am router' message may also indicate the cost of routing. If the 'I am router' message is received at a node having connectivity to the same cluster to which the 'I am router' message declares connectivity, but whose routing cost is lower, such node broadcasts its own 'I am router' message to the same cluster. The routing cost may be, for example, the aggregate of the routing cost of the node sending the 'I am router' message and the routing cost in the other cluster to which the routing partnership is established. The cost may be computed based on the remaining energy resources of the node.

When a node in a routing mode loses connectivity to a partnering router node, the node may broadcast 'I am router cancel' message in its own cluster. The message may contain the ID of the neighboring cluster that the node is routing to, as well as the ID of the pair router node in the neighboring cluster. The 'I am router cancel' message can be also broadcasted for other reasons, such as depleted power supply of the node. If routing partnership to a neighboring cluster is lost (e.g. due to a 'I am router cancel' message or the death of a routing node), any node in the cluster that has one-hop connectivity to the neighboring cluster in question may try to become a new router.

Figure 7:
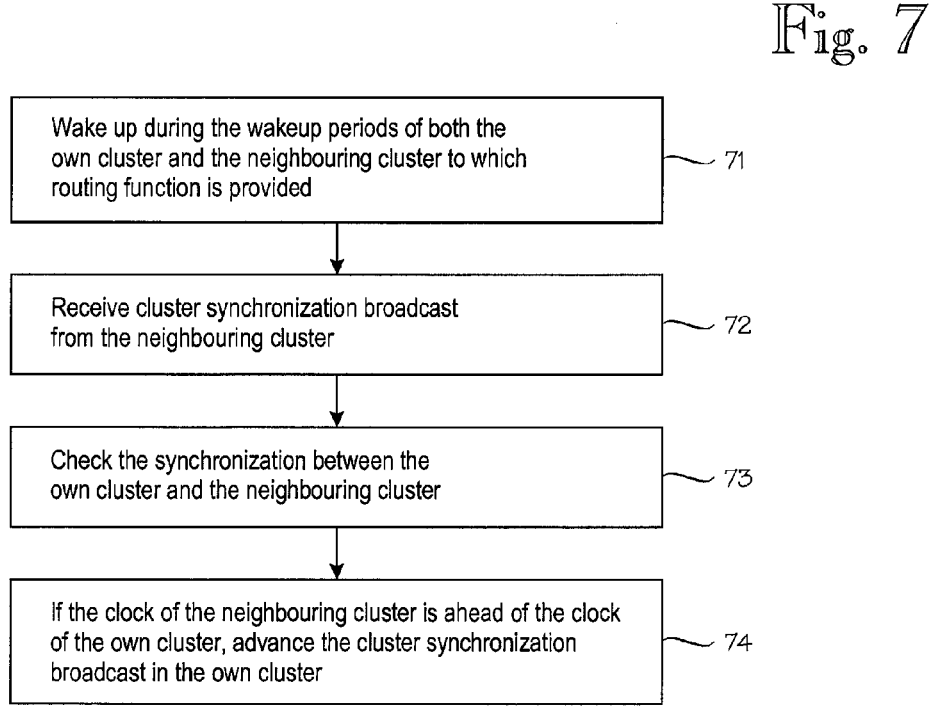
FIG. 7 is a flow diagram illustrating an example of an inter-cluster synchronization.

As illustrated in FIG. 7, according to an exemplary embodiment of the invention, in a routing mode a node is awake both during the cluster timeslot that the node belongs to and also during the cluster timeslot(s) to which the node has set up routing partnerships (step 71). According to an embodiment of the invention, when a routing node receives a cluster synchronization broadcast from the neighboring cluster (step 72), it may check the clock synchronization between the clusters (inter-cluster synchronization) (step 73). If the clock of the neighboring cluster is ahead (behind), the routing node advances (delays) the cluster synchronization broadcast in its own cluster (step 74).

According to an exemplary embodiment of the invention, the computation of the inter-cluster synchronization may follow the following logic:
if own cluster id 6
if other cluster id 4
then
own cluster synchronization broadcast start time=other cluster synchronization broadcast receive time+inter-cluster time*2+full cluster synchronization time*2+cluster synchronization time after the cluster synchronization broadcast.

All nodes within one cluster are able to communicate with each other directly, i.e. no intermediary nodes are required for node-to-node communication within a cluster. However, the data exchange between clusters is executed by routing nodes at cluster boarders. In case the packet must traverse several clusters it does so in a multi-hop manner. Thus, a node may participate not only as a host, but also as a router forwarding packets to their destinations. When network topology changes unpredictably due to node movements or any other reasons, the hosts need to determine the routes to other nodes frequently. Ad-hoc On-Demand Distance Vector routing protocol (AODV) is one of the developed protocols that enable routing with frequently changing topologies. AODV establishes routes when they are first needed and does not maintain routes to destinations that are not in active communication. In exemplary embodiments of the invention, the routing protocol is a loosely synchronized networking protocol that may employ the principles of Ad-hoc On-Demand Distance Vector (AODV) routing. However, protocol modifications according to various embodiments of the invention offer better performance than the original AODV protocol. However, also other type of routing protocols may be employed, such as Destination-Sequenced Distance Vector (DSDV) protocol.

It will be obvious to a person skilled in the art that, as the technology advances, the inventive concept can be implemented in various ways. The invention and its embodiments are not limited to the examples described above but may vary within the scope of the claims.

The invention claimed is:

1. A method of operating a node in an ad hoc network, comprising:
joining or initiating a cluster in an ad hoc network, wherein a plurality of nodes are able to self-organize themselves into clusters of nodes, each cluster comprising a collection of nodes which are capable of one-hop communication directly with each other;
performing an intra-cluster temporal synchronization of sleep and awake periods of nodes in a power-saving mode of operation within the own cluster without any single node coordinating the operation of the individual nodes in the cluster;
accessing a communication medium using a contention mechanism without any single node coordinating the operation of the individual nodes in the cluster;
selectively assuming, when appropriate, a routing function to a neighboring cluster so as to self-organize the clusters of nodes into a multi-hop ad hoc network comprised of individual clusters of nodes;
performing, when the routing function is assumed, inter-cluster data routing between the own cluster and the neighboring cluster; and
performing, when the routing function is assumed, an inter-cluster synchronization of awake periods of the own cluster and the neighboring cluster to be temporally non-overlapping.

2. The method of claim 1, further comprising keeping awake during the awake periods of both the own cluster and the neighboring cluster to perform the inter-cluster synchronization and to provide an inter-cluster multi-hop communication.

3. The method of claim 1, further comprising employing a contention mechanism for medium access within a cluster.

4. The method of claim 1, wherein the intra-cluster synchronization comprises periodically broadcasting synchronization messages to and receiving synchronization messages from nodes belonging to the cluster, at beginning of the awake period of the cluster in order to synchronize clocks of the nodes according to the synchronization messages broadcast within the cluster.

5. The method of claim 4, further comprising, in response to receiving a cluster synchronization message from another node in the cluster, synchronizing the receiving node's own clock using a receive time of the received cluster synchronization message and a time offset from a awake period start time indicated in the received cluster synchronization message.

6. The method of claim 1, wherein the inter-cluster synchronization comprises:
detecting, when the routing node function is assumed, an intra-cluster synchronization of the neighboring cluster; and
adjusting, when the routing node function is assumed, the intra-cluster synchronization of the own cluster dependent on the detected intra-cluster synchronization of the neighboring cluster.

7. The method of claim 1, wherein the inter-cluster synchronization comprises:
synchronizing, when the routing node function is assumed, the own clock according to cluster synchronization messages broadcasted within the own cluster;
detecting, when the routing node function is assumed, a clock of the neighboring cluster based on cluster synchronization messages broadcasted within the neighboring cluster;
checking, when the routing node function is assumed, whether the clock of the own cluster and the clock of the neighboring cluster are synchronized; and
performing, if necessary, when the routing node function is assumed, the inter-cluster synchronization by advancing or postponing a transmission time of cluster synchronization messages within the own cluster in relation to the clock of the neighboring cluster.

8. The method of claim 1, wherein the joining to a cluster comprises:
monitoring cluster synchronization messages broadcasted in the ad hoc network for a predetermined period of time,
if cluster synchronization messages are received during the monitoring period, selecting one of existing clusters according to some criteria based on the received cluster synchronization messages, and initiating a cluster join procedure to join the selected cluster.

9. The method of claim 8, wherein the cluster join procedure comprises:
sending a join request message to one of the nodes in the selected existing cluster,
in response to receiving a join response message, which indicates that the join request is accepted and contains a list of nodes that are currently in the selected cluster, sending inquiry to all nodes in the selected cluster; and
joining the selected cluster if a reply is received from all nodes in the selected cluster.

10. The method of claim 8, further comprising:
initiating a new cluster initiate procedure, if no cluster synchronization messages are received during the monitoring period, or if the cluster join procedure fails.

11. The method of claim 1, wherein the time domain is divided into time slots and the awake period of each cluster occupies one time slot in the time domain.

12. The method of claim 11, wherein a new cluster initiate procedure comprises:
selecting for the new cluster a free time slot which is not occupied by neighboring clusters in the time domain;
deriving an identifier of the new cluster from an identifier of the selected time slot;
broadcasting a cluster initiation message declaring the new cluster; and
operating in the new cluster whose wakeup period occupies the selected time slot.

13. The method of claim 11, further comprising:
staying awake and monitoring all the time slots in the time domain at predetermined intervals, to detect any neighboring clusters that the current cluster is not aware of.

14. The method of claim 1, wherein the selectively assuming a routing function comprises:
setting up a routing partnership with a node in a neighboring cluster which becomes the partnering router; and
broadcasting a notification of setting up of the routing partnership in the own cluster.

15. The method of claim 14, further comprising:
in response to losing the routing partnership with the node in the neighboring cluster, broadcasting a notification of cancellation of the routing partnership in the own cluster.

16. A network node apparatus, comprising a processor unit and a radio communication unit, the processor unit being configured to perform routines:
joining or initiating a cluster in an ad hoc network, wherein a plurality of nodes are able to self-organize themselves into clusters of nodes, each cluster comprising a collection of nodes which are capable of one-hop communication directly with each other;
performing an intra-cluster temporal synchronization of sleep and awake periods of nodes in a power-saving mode of operation within the own cluster without any single node coordinating the operation of the individual nodes in the cluster;
accessing a communication medium using a contention mechanism without any single node coordinating the operation of the individual nodes in the cluster;
selectively assuming, when appropriate, a routing function to a neighboring cluster so as to self-organize the clusters of nodes into a multi-hop ad hoc network comprised of individual clusters of nodes;
performing, when the routing function is assumed, inter-cluster data routing between the own cluster and the neighboring cluster; and
performing, when the routing function is assumed, an inter-cluster synchronization of awake periods of the own cluster and the neighboring cluster to be temporally non-overlapping.

17. An ad hoc network, comprising a plurality of network nodes, each of the plurality of nodes including a processor unit and a radio communication unit, the processor unit being configured to perform routines:
joining or initiating a cluster in an ad hoc network, wherein a plurality of nodes are able to self-organize themselves into clusters of nodes, each cluster comprising a collection of nodes which are capable of one-hop communication directly with each other;
performing an intra-cluster temporal synchronization of sleep and awake periods of nodes in a power-saving mode of operation within the own cluster without any single node coordinating the operation of the individual nodes in the cluster;
accessing a communication medium using a contention mechanism without any single node coordinating the operation of the individual nodes in the cluster;
selectively assuming, when appropriate, a routing function to a neighboring cluster so as to self-organize the clusters of nodes into a multi-hop ad hoc network comprised of individual clusters of nodes;
performing, when the routing function is assumed, inter-cluster data routing between the own cluster and the neighboring cluster; and
performing, when the routing function is assumed, an inter-cluster synchronization of awake periods of the own cluster and the neighboring cluster to be temporally non-overlapping.

\* \* \* \* \*